UNITED STATES PATENT OFFICE.

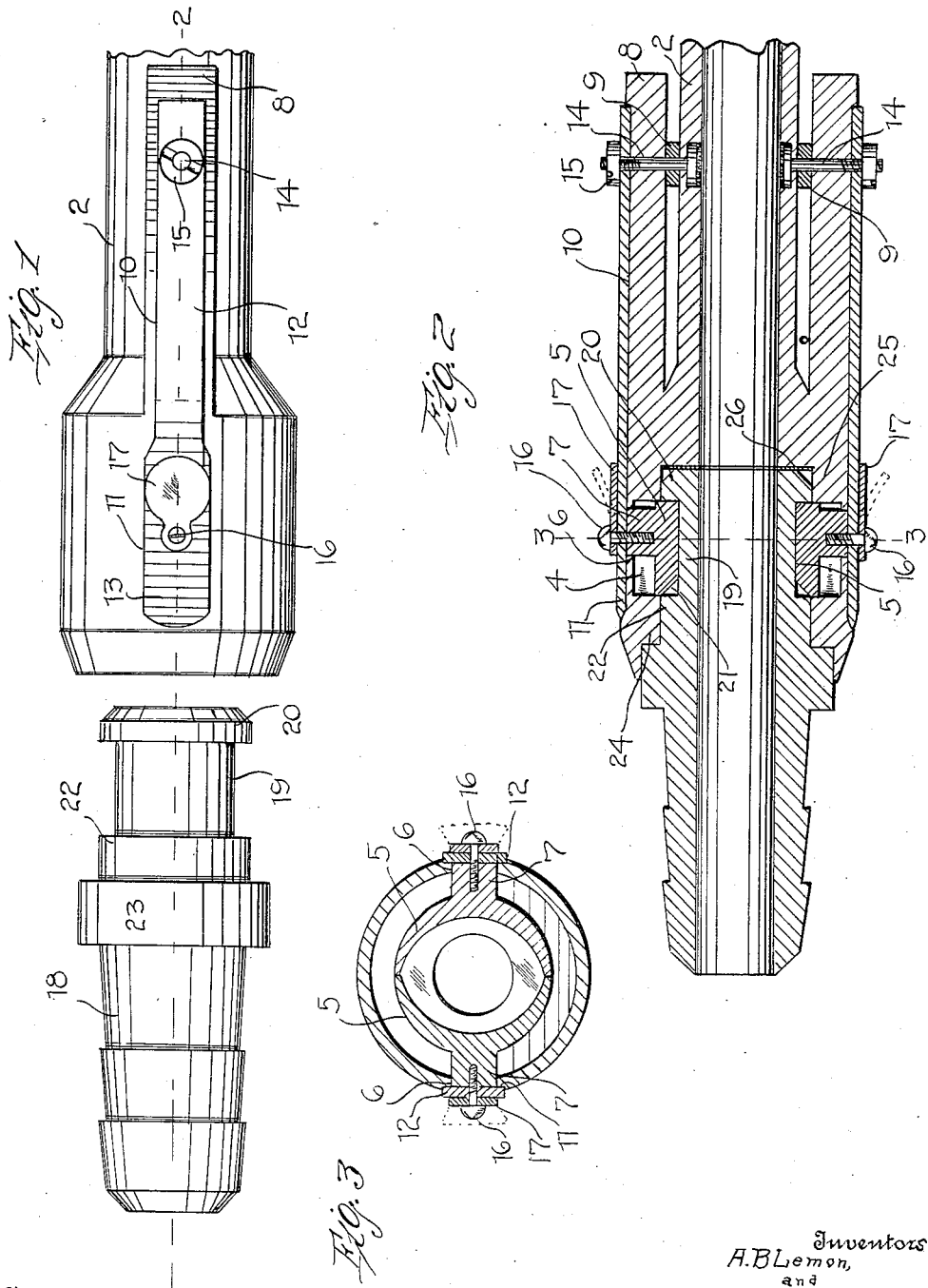

ALVY B. LEMON AND CARL C. CULVER, OF ALLUWE, OKLAHOMA.

HOSE-COUPLING.

1,076,045.

Specification of Letters Patent.

Patented Oct. 21, 1913.

Application filed November 12, 1912. Serial No. 730,995.

*To all whom it may concern:*

Be it known that we, ALVY B. LEMON and CARL C. CULVER, citizens of the United States, residing at Alluwe, in the county of Nowata and State of Oklahoma, have invented certain new and useful Improvements in Hose-Couplings, of which the following is a specification, reference being had to the accompanying drawings.

This invention relates to new and useful improvements in hose couplings and more particularly to that class which may be quickly and easily connected and disconnected.

The object of the invention is to provide a simple and practical coupling of this character which may be used upon various kinds of hose, pipes and the like and which is provided with locking means for effectively retaining the members in coupled relation, but at the said time will enable them to be quickly and easily uncoupled.

Another object of the invention is to provide a hose coupling of this character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claim, and shown in the accompanying drawings in which, Figure 1 is a side elevation of a hose coupling constructed in accordance with our invention. Fig. 2 is a longitudinal sectional view. Fig. 3 is a transverse sectional view.

Referring more particularly to the drawings, 1 indicates the annular body of the female part of the coupling. Formed integral with the body 1 at one end thereof is a reduced extension to which the hose or other conduit is adapted to be connected in any approved manner. The body portion 1 is provided adjacent its outer end and upon the inner side thereof with an annular recess 4 in which is arranged the arcuate locking plates 5. Formed integral with the back of the plates, and extending out through the openings 6 in the body 1 are the lugs 7. Formed integral with the body and extending longitudinally in parallel relation with the reduced extension 2 are the arms 8 which are arranged at diametrically opposite points upon each side of the body. These arms 8 are spaced from the extension 2 by means of the blocks 9 which may be constructed of leather, wood or other suitable material. The arms 8 are provided upon their outer faces with the longitudinal grooves 10 which communicate at one of their ends with the elongated grooves 11 formed in the outer face of the body. Arranged within these grooves 10 and 11 are the resilient plates 12 having enlarged portions 13 formed upon one of their ends for engagement in the grooves 11. These plates are held securely in position by means of the bolts 14 which pass through the reduced extension 2, through the block 9, through the ends of the arms 8 and through the inner ends of said plates. Nuts 15 are then threaded upon the outer ends of the bolts to securely hold the plates 12 within the grooves in the arms. The enlarged ends 13 of the plates 12 are secured to the locking plates 5 by means of the screws 16 which pass through the plates and into the lugs 7. Straps 17 are also secured to the plates 12 by means of the screws 16 so that the arcuate plates 5 may be readily actuated within the groove 4.

The male part 18 of the coupling is provided upon one end with a neck 19, terminating in a beveled flange shown at 20 which is adapted to engage with the beveled faces 21 upon the locking plates 5 when the male part 2 is inserted within the female part 1, the neck 19 passing between the locking plates and engaging behind the rear end thereof as shown in Fig. 2, the annular shoulder 22 engaging with the outer ends of the locking plates. The annular body portion of the male member 18 is provided with an enlarged shoulder 23 which is adapted to engage with an annular shoulder 24 formed in the end of the part 1. An annular shoulder 25 is formed at the inner end of the body 1 of the female part and arranged at the base of this shoulder is a rubber packing ring 26 against which the end of the part 18 is adapted to abut, thus preventing any leakage of water, gas or the like which is to be conveyed through the hose or pipes.

From the above it will be apparent that the male part 18 of the coupling may be readily inserted within the female part so that the annular neck 19 will engage between the locking plates 5, said locking plates being arranged within the annular groove 4 opposite the neck 19 thus preventing any longitudinal movement of the part 18. The locking plates 5 are normally held in a locked position by the resiliency of the plates 12 to which the locking plates are secured. To release the male member 18 the straps 17 are pulled outwardly until the locking plates are disposed entirely within the groove 4 thus leaving the inner end of the male part 18 free to be withdrawn from the body 1.

By the provision of the longitudinally extending arms 8 on opposite sides of the coupling member 1, the coupling may be readily grasped to move the hose from place to place, said arms affording convenient hand holds to be grasped by the fingers.

From the above description taken in connection with the accompanying drawings, it will be apparent that we have provided a simple and practical hose coupling wherein the male and female coupling parts may be readily connected or quickly and easily disconnected. It will also be apparent that the device is extremely simple in construction and can be manufactured at a comparatively low cost.

While we have shown and described the preferred form of our invention, it will be obvious that various changes in the details of construction and in the proportions may be resorted to for successfully carrying our invention into practice without sacrificing any of the novel features or departing from the scope of the appended claim.

What we claim is:—

The combination in a coupling, of a pair of body portions, clamping means at the juncture of the body portions, one of said body portions having grooves therein, arms provided upon said body portions adjacent the grooves, resilient plates disposed within the grooves and engaging one body portion and the arms formed thereon, said arms extending parallel to and spaced from one end of the body portion, said body portion having recesses formed therein, said recesses being disposed in registration with alining openings provided in the arms and the resilient plates, bolts extending through the said alining openings, the heads of said bolts being disposed within the recesses in the body portion, nuts disposed upon the bolts and contacting with the resilient plates, and spacing means disposed upon the bolts between the arms and the body portion, as and for the purposes set forth.

In testimony whereof we hereunto affix our signatures in the presence of two witnesses.

ALVY B. LEMON.
CARL C. CULVER.

Witnesses:
 NOOLIE MILAM,
 J. B. PARKS.

Copies of this patent may be obtained for five cents each, by addressing the "Commissioner of Patents, Washington, D. C."